Figures 1, 2:
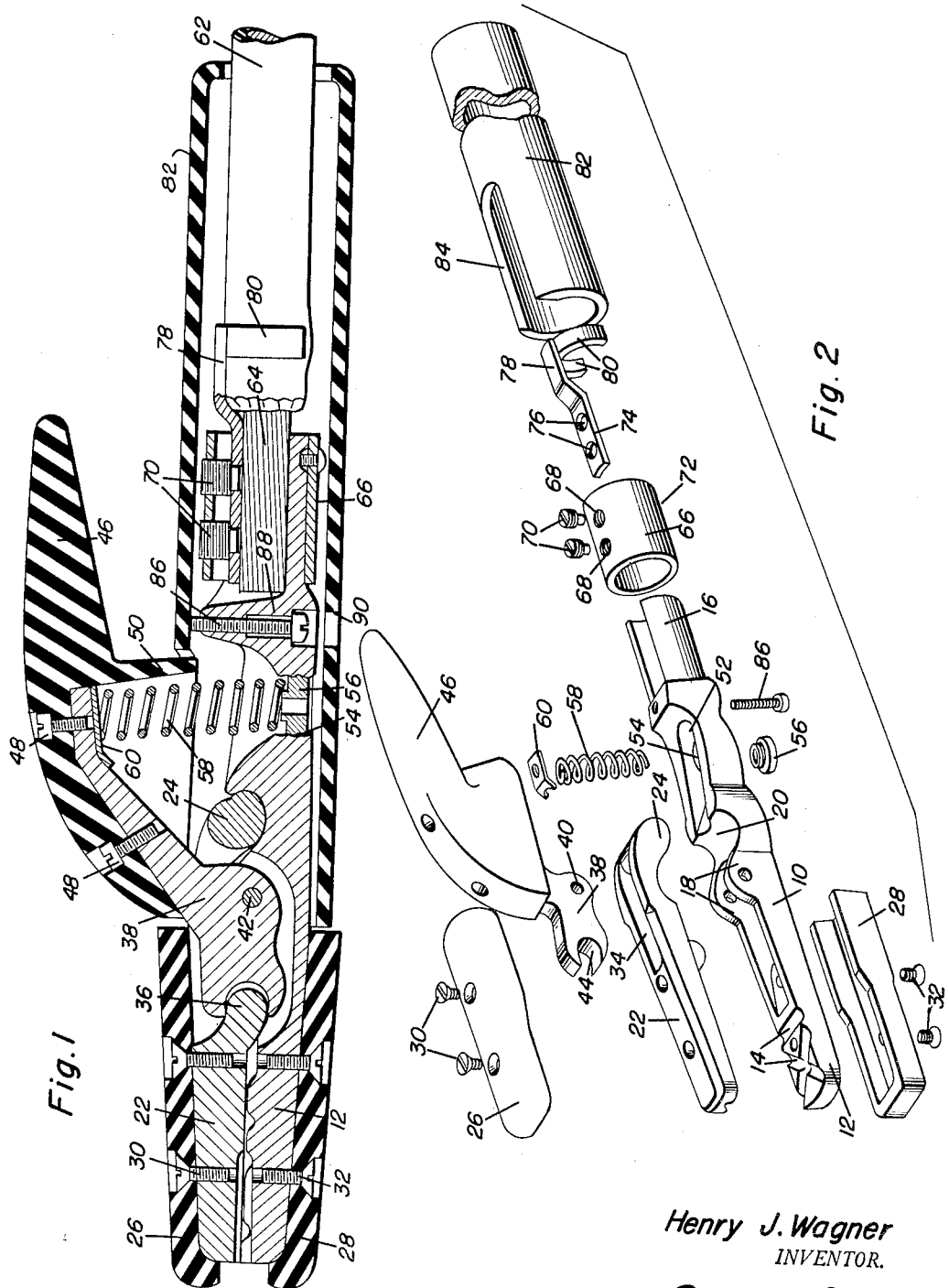

Nov. 1, 1955 H. J. WAGNER 2,722,588
ELECTRODE HOLDER
Filed Sept. 21, 1953

Henry J. Wagner
INVENTOR.

United States Patent Office 2,722,588
Patented Nov. 1, 1955

2,722,588

ELECTRODE HOLDER

Henry J. Wagner, Jackson, Mo.

Application September 21, 1953, Serial No. 381,208

6 Claims. (Cl. 219—8)

This invention comprises novel and useful improvements in an electrode holder and more specifically pertains to an electrode holding clamp specifically adapted for gripping a welding electrode in an improved manner and more effectively supplying the electric welding current thereto.

The primary object of this invention is to provide an improved electrode holder which shall have an improved pivoting action of its jaws; an improved resilient action urging the jaws to closed position together with improved means for adjusting this resilient action; an improved means for electrically connecting a conductor to the jaws of the holder; and an improved actuating lever for manipulating the jaws.

Further ancillary objects of the invention are to provide an electrode holder having a more compact, dependable and secure construction of its elements and which will admit of servicing and replacement of its various components.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a vertical central longitudinal sectional view through an electrode holder incorporating therein the principles of this invention, an electric conductor being shown connected to the holder; and, Figure 2 is an exploded perspective view of the various components of the novel electrode holder in accordance with this invention.

The novel electrode holder embodying the principles of this invention, as illustrated in the drawings, includes a base 10 which at one end thereof constitutes a fixed jaw 12 having a plurality of electrode receiving grooves 14 therein disposed in various positions and at its opposite extremity or its rear end is provided with a semi-cylindrical sleeve-like extension 16. Intermediate its ends the base is provided with a pair of upstanding apertured ears or lugs 18 and between these ears and the sleeve 16 the base is provided further with a recess or socket 20 which constitutes a pivot or bearing socket. A movable jaw 22 is further provided which at its rear end is provided with a bearing member 24 complementary to and pivotally engaged and journaled in the socket 20. At its forward or front end the movable jaw 22 is provided upon its face adjacent the fixed jaw 12, with similar grooves which are complementary to the grooves 14 to cooperate therewith in gripping and holding an electrode in various angular positions in the device.

A pair of dielectric guards, covers or shields 26 and 28 are secured to the outer surfaces of the movable and fixed jaws respectively as by fastening screws 30 and 32. These guards serve to surround, enclose and house the electrically conducting fixed and movable jaws to prevent damage to the same and to prevent the jaws from electrical contact with other members than the electrodes for which they are designed to carry. Intermediate its ends, the movable jaw 22 is provided with a longitudinal slot 34 and the forward edge of this slot is depressed to form a downwardly extending projection or lip 36. The sides of the movable jaw 22 are proportioned to lie between the ears 18. A movable jaw actuating lever 38 is provided having an aperture 40 adjacent its midportion adapted to receive a pivot or fulcrum pin 42 which extends through the apertures of the ears 18 for mounting the actuating lever therebetween. At its forward end the actuating lever is provided with a socket, recess or fork 44, and the lever is adapted to have its forward portion disposed through the slot 34 of the movable jaw with the work 44 receiving the projection 36 thereof. To the rear portion of the actuating lever there is secured a handle 46 of suitable dielectric material, as by means of screws 48. This handle has a depending skirt or shield 50 which partially encloses the space between the base 10 and the rear end of the actuating lever, as set forth hereinafter.

Between the socket 20 and the sleeve 16 the base 10 is further provided with a recess 52 which is provided with an internally threaded opening 54 extending through the bottom of the base, and which opening is closed by a screw threaded plug 56. A compression spring 58 is insertable through the opening 54 in the base 10 and is adapted to abut at its lower end upon the plug 56 which both retains the spring in place and constitutes a spring seat therefor, and also provides the means for adjusting the spring, whose upper end is seated against a base plate 60 which is disposed in contact with the rear end of the actuating lever 38. The spring thus yieldingly urges through the actuated lever, the fixed and movable jaws into a closed position, and the closing force of these jaws can be readily adjusted by the member 56. It will be observed that by this means the spring can be readily removed through the opening 54 by simply removing the member 56, and replaced as desired.

Current is supplied to the holder by means of an electrical conductor 62 whose extremity 64 is stripped of insulation and placed in the electrically conducting semi-cylindrical sleeve 16 forming the rear extremity of the base 10. The conductor is clamped and maintained in good electric contact with the base member by means of a sleeve 66 of electrically conductive material, this sleeve being apertured as at 68 and threaded for the reception of clamping bolts 70 which extend through this sleeve and into clamping contact with the conductor extremity 64. A setscrew or the like 72 is also provided on the sleeve to maintain the same in stationary position upon the sleeve 16, as will be apparent from Figure 1.

A metallic strap or plate 74 apertured as at 76 is also provided and disposed between the sleeve 66 and the conductor extremity 64, being retained therebetween and in position by the above mentioned clamping screws 70. This member 74 is provided with offset end portion 78 which lies upon the insulation of the conductor 62, and at its outer end is provided with arcuate laterally extending arms 80 which are adapted to partially embrace and grip the insulated portion of the conductor 62. The member 74 thus serves to reinforce and strengthen the mechanical attachment of the conductor to the base of the electrode clamp and prevent bending at this point thereby greatly increasing the life of the electrical connection and preventing wearing and abrading of the insulation of the conductor at this point.

A tubular dielectric housing 82 is provided which loosely encircles the conductor 62 and the connection by which the same is secured to the rear end of the base 10. This dielectric housing extends, as shown in Figure 1, to the rear portions of the fixed and movable jaws themselves, and is provided with a longitudinal slot 84 upon its upper portion which is adapted to receive therethrough the arm of the actuating lever 38 and the skirt 50 of the insulating handle 46 thereof. The skirt thus serves to close this opening and prevent the ingress of foreign matter into the working parts of the electrode holder. The tubular housing 82 is removably clamped upon the rear portion of the base 10 by means of a setscrew 86, disposed in a recess 88 of the base 10 and which abuts the interior surface of the housing 82. Access is obtained to this groove through an opening 90 in the member 82, as will be apparent from Figure 1.

It should be particularly noted that the electric current is supplied by the conductor 62 directly to the base 10 and from the latter to the fixed jaw 12. In addition, current is also supplied through the large pivoted electrically conducting joint of the bearing member 24 of the movable jaw and the bearing socket 20 of the base 10 to the movable jaw, thereby assuring an easy and maximum flow of current to the jaws 12 and 22 and from the latter to the electrode clamped and held thereby.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An electrode clamp for electric welders comprising a base having a fixed jaw at its front end and means at its rear end for connecting an electric conductor thereto, a movable jaw having a slot intermediate its ends, means for pivotally journaling the movable jaw on said base including a bearing projection on said movable jaw and a bearing recess in said base, an actuating lever for said movable jaw pivoted to said base and extending through the slot and operatively engaging said movable jaw, resilient means operatively interposed between said lever and base and yieldingly urging said jaws together.

2. An electrode clamp for electric welders comprising a base having a fixed jaw at its front end and means at its rear end for connecting an electric conductor thereto, a movable jaw, means for pivotally journaling the movable jaw on said base, an actuating lever for said movable jaw pivoted to said base and operatively engaging said movable jaw, resilient means operatively interposed between said lever and base and yieldingly urging said jaws together, said movable jaw having a slot intermediate its ends, said lever having a portion extending through said slot and pivoted to said base, the said operative engagement of said lever with said movable jaw comprising a fork on said lever and a lug on said movable jaw engaged in said fork.

3. An electrode clamp for electric welders comprising a base having a fixed jaw at its front end and means at its rear end for connecting an electric conductor thereto, a movable jaw, means for pivotally journaling the movable jaw on said base, an actuating lever for said movable jaw pivoted to said base and operatively engaging said movable jaw, resilient means operatively interposed between said lever and base and yieldingly urging said jaws together, said journaling means comprising a socket in said base and a bearing projection at the rear end of said movable jaw seated in said socket, said movable jaw having a slot intermediate its ends, said lever having a portion extending through said slot and pivoted to said base.

4. An electrode clamp for electric welders comprising a base having a fixed jaw at its front end and means at its rear end for connecting an electric conductor thereto, a movable jaw, means for pivotally journaling the movable jaw on said base, an actuating lever for said movable jaw pivoted to said base and operatively engaging said movable jaw, resilient means operatively interposed between said lever and base and yieldingly urging said jaws together, said journaling means comprising a socket in said base and a bearing projection at the rear end of said movable jaw seated in said socket, said movable jaw having a slot intermediate its ends, said lever having a portion extending through said slot and pivoted to said base, the said operative engagement of said lever with said movable jaw comprising a fork on said lever and a lug on said movable jaw engaged in said fork.

5. The combination of claim 1 including a dielectric sleeve enclosing the rear portion of said base and said connecting means, retaining means on said base disposed entirely within the sleeve and engaging said sleeve upon its interior only for releasably securing the former to the latter.

6. The combination of claim 1 including a dielectric sleeve enclosing the rear portion of said base and said connecting means, retaining means on said base disposed entirely within the sleeve and engaging said sleeve upon its interior only for releasably securing the former to the latter, said sleeve having an opening for obtaining access to and for passage therethrough of said retaining means.

References Cited in the file of this patent

UNITED STATES PATENTS

| | | |
|---|---|---|
| 1,851,039 | Fausek | Mar. 29, 1932 |
| 2,236,372 | Kotchi | Mar. 25, 1941 |
| 2,403,086 | Kentworthy | July 2, 1946 |
| 2,453,648 | Wagner | Nov. 9, 1948 |